June 19, 1923.
V. L. ADAMS
PRESSURE CONTROLLING DEVICE
Filed June 7, 1922
1,459,666
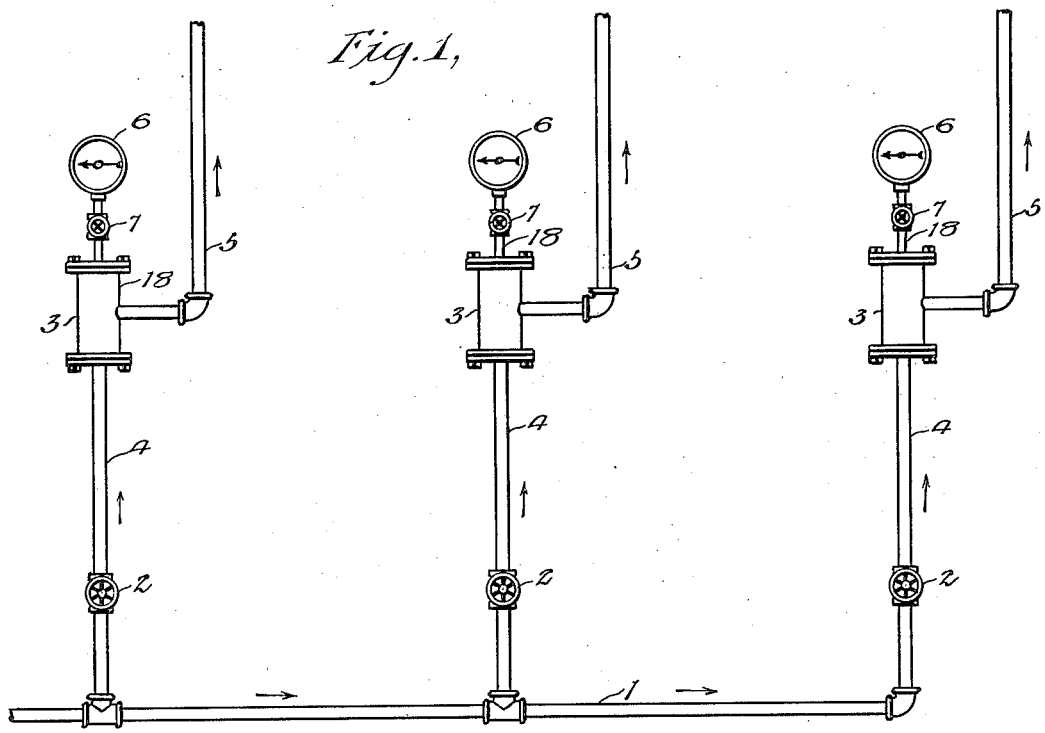
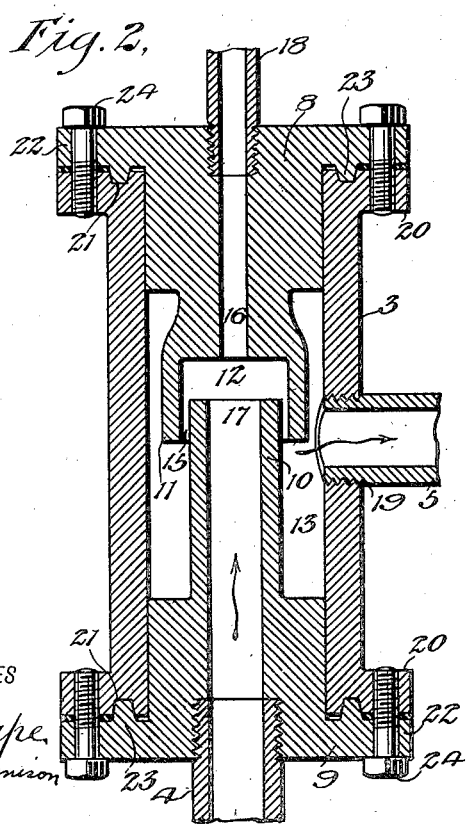
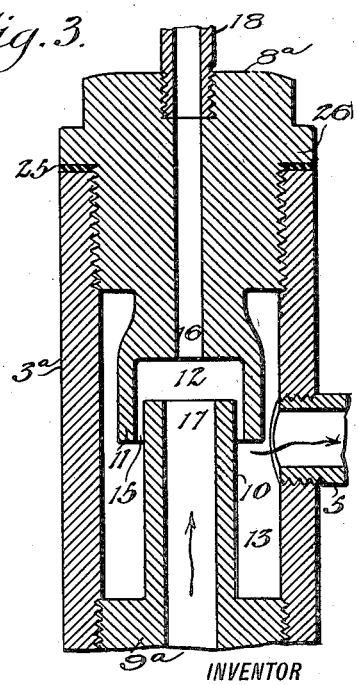
WITNESSES
Edw. Thorpe
Frank F. Palmison
INVENTOR
Victor L. Adams
BY
ATTORNEYS Patented June 19, 1923.

1,459,666

UNITED STATES PATENT OFFICE.

VICTOR LESLIE ADAMS, OF WACO, TEXAS.

PRESSURE-CONTROLLING DEVICE.

Application filed June 7, 1922. Serial No. 566,674.

*To all whom it may concern:*

Be it known that I, VICTOR LESLIE ADAMS, a citizen of the United States, and a resident of Waco, in the county of McLennan and State of Texas, have invented a new and Improved Pressure-Controlling Device, of which the following is a full, clear, and exact description.

This invention relates to a pressure controlling device and is adapted to effect the regulation of two or more expansion valves in a refrigerating plant so as to enable an operator to maintain the various refrigerating sections in the plant under the same degree of refrigeration.

The general object of the invention is to provide an improved device which shall enable the operator to regulate the various expansion valves of an ice or refrigerating plant so that the refrigerating fluid admitted into the various refrigerating sections of the plant may be known and thereby have the sections operating under an equal degree of refrigeration.

It is also an object of my invention to provide a fluid pressure control assemblage involving an expansion valve and a pressure gage communicating with the discharge side of said valve, and subject, for functioning, to a pressure increased beyond the expansion pressure.

A further object is that of providing a device capable of generating an increased pressure from a low expansion pressure and to employ the increased pressure in actuating the mechanism of the pressure gage.

Further objects and the distinctive features and advantages of the invention will appear as the description proceeds.

Reference is to be had to the accompanying drawings forming a part of this specification, it being understood that the drawings are merely illustrative of one example of the invention.

Figure 1 shows a section of a refrigerating plant provided with a number of feed lines to each of which is applied a pressure indicating device;

Figure 2 is a sectional view of the device adapted to generate a pressure for a low pressure gage;

Figure 3 is a modified form of the device shown in Figure 2.

In refrigerating or ice plants where the refrigeration is accomplished by a number of sections, it is highly desired to regulate the fluid pressure in each section so that an even degree of refrigeration takes place throughout the plant. The refrigerating fluid, after it is released by the expansion valve advances in a low pressure or vapor-like gas which cannot be measured with an ordinary gage and for this reason its volume cannot be known. My invention serves to create in the expanded fluid a pressure above the expansion pressure so as to operate a low pressure gage where the gage would not respond to the low expansion pressure and thereby the operator is enabled to regulate each section with respect to the others.

In the drawings the main supply pipe 1 is tapped and connected to a plurality of expansion valves 2, which in turn are connected to the lower end of casing 3 by means of pipes 4. To the casings are connected feed pipes 5 leading to the refrigerating sections (not shown) and to the upper end of the casings are connected low pressure gages 6, which may conveniently be controlled by valves 7 interposed between the gages and casings. The gages 6 are preferably calibrated and regulated so that all may indicate alike under the same pressure.

In the casings 3 are arranged nozzled plugs 8 and 9, the latter being connected to the expansion valve 2 and the former to the gage valve 7. The plug 9 has a reduced portion 10 at its inner end and the plug 8 has an enlarged portion 11 overlapping the end of the reduced portion 10 forming between the two an expansion chamber 12 communicating with the chamber 13 by means of annular passageway 15 formed between the inner face of the enlarged portion 11 and outer face of reduced portion 10. Both plugs 8 and 9 present centrally disposed bores 16 and 17 respectively. These bores are in line with each other and each is threaded at its outer end to accommodate the threaded ends of pipes 18 and 4 respectively. The chamber 13 is connected to feed pipe 5 by a threaded opening 19 disposed in a plane adjacent the plane of discharge of annular passageway 15 and adapted to receive the threaded end of pipe 5.

It will be observed that the diameter of bore 17 is greater than the diameter of bore 16 and that the area of bore 17 is also greater than the area of annular passageway 15. Thus, upon opening the expansion valve 2 the liquid ammonia, carbonic acid or any other expansive fluid enters pipe 4 and there expands rushing upwardly and entering with some speed chamber 12 where its course of travel is abruptly changed rearwardly, and being unable to continue its speedy rush it accumulates itself in chamber 12, pipe 4 and pipe 16, and forms a pressure agent for moving the indicating mechanism of the gage 6.

The pressure of one volume of fluid in the pipe 4, chamber 12 and pipe 16 may be varied by varying the distance between the plugs 8 and 9. Therefore, assuming that the gauges 6 are calibrated and that each will indicate the same pressure under the same volume of fluid, the two nozzles are brought nearer or farther apart in case one of the gauges fail to indicate a known pressure under a known volume. Hence, the pressure generated in the chamber 12 beyond the expansion pressure may be varied by increasing or decreasing the distance between the adjacent ends of the plugs 8 and 9 to thus vary the increase of pressure by volumetrically varying the fluid in the chamber 12 in which the increase of pressure is produced.

The casings 3 each provide a flange 20 at each end and an annular groove 21, which mate with flanges 22 and annular ridges 23, forming a part of each plug 8 and 9. The grooves and ridges are adapted to prevent fluid leakage at the joint of the flanges, and they are pressed against each other by bolts 24 clamping the plug flanges on the casing flanges.

In the form shown in Figure 3 the casing 3ª is threaded interiorly at both ends to receive the plugs 9ª. Gaskets 25 are interposed between the shoulder 26 of each plug and the adjacent end of the casing. Those features in Figure 3 corresponding with Figure 2 have been similarly numbered.

I would state in conclusion that while the illustrated example constitutes a practical embodiment of my invention I do not limit myself strictly to the mechanical details herein illustrated and described since, manifestly, the same can be considerably varied without departing from the spirit of the invention as defined in the appended claims.

Having thus described my invention, I claim:

1. In a pressure controlling device of the class described, an outer casing open at both ends, a nozzled plug for each end, the inner ends of said nozzle plugs overlapping each other and forming a chamber, and a gage connected to said chamber.

2. In a pressure controlling device of the class described, a main supply line, an expansion valve connected to said main pipe line, a feed line, a casing including a pair of aligned nozzles interposed between said expansion valve and said feed line, one of said nozzles overlapping the other and forming between the two a chamber, and a gage connected to said chamber.

3. In a pressure controlling device for refrigerating plants, a casing open at both ends, a bored plug for each end, the end of one plug telescoping into the other, said plugs forming between the two a pressure chamber, a gage connected to one of said plugs and communicating with said chamber, said casing presenting a side opening, a feed line connected to said opening, said plugs forming adjacent said chamber an annular passageway forming communication between pressure chamber and said feed line.

4. In a pressure controlling device, a casing, a nozzle having a comparatively larger bore extending within the casing, a nozzle having a comparatively smaller bore extending within the same casing opposite to said first mentioned nozzle, said last-mentioned nozzle having a cupped head enveloping a portion of the discharge end of said first mentioned nozzle forming therebetween a pressure chamber, and means to indicate the pressure in said chamber.

5. In a pressure controlling device for refrigerating plants, means adapted to be interposed between the high pressure line and the low pressure line of the refrigerating plant, said means comprising a casing, a plug formed with a through bore connected to one end of said casing, a second plug also formed with a through bore connected to the opposite end of said casing, the inner end of said last mentioned plug overlapping the inner end of the first mentioned plug, there forming a chamber between the inner ends of said plugs, and an indicating instrument connected to the through bore of the last mentioned plug for indicating the pressure of the refrigerant emitted from the first mentioned plug.

6. In a means for measuring the quantity of refrigerating fluid passing from a high pressure line of a refrigerating plant to a low pressure line thereof, means interposed between the two lines to subject the expansion of the refrigerating fluid in progressive steps, and means for indicating the pressure of said refrigerating fluid before the final step of expansion.

VICTOR LESLIE ADAMS.